(12) United States Patent
Roh et al.

(10) Patent No.: US 11,866,086 B2
(45) Date of Patent: Jan. 9, 2024

(54) FOLDABLE STEERING WHEEL

(71) Applicants: Hyundai Motor Company, Seoul (KR); Kia Corporation, Seoul (KR); Joyson Safety Systems Korea Co., Ltd., Hwaseong-si (KR)

(72) Inventors: Kyeong Boo Roh, Hwaseong-Si (KR); Beom Jung Kim, Hwaseong-Si (KR); Yu Ji Son, Hwaseong-Si (KR); Byung Woo Noh, Seoul (KR); Yong Sun Kim, Seoul (KR); Seung Min Kim, Bucheon-Si (KR); Sung Woo Chang, Hwaseong-Si (KR); Sung Jin Hong, Seoul (KR); Tae Woo Kim, Wonju-Si (KR)

(73) Assignees: Hyundai Motor Company, Seoul (KR); Kia Corporation, Seoul (KR); Joyson Safety Systems Korea Co., Ltd., Hwaseong-si (KR)

( * ) Notice: Subject to any disclaimer, the term of this patent is extended or adjusted under 35 U.S.C. 154(b) by 0 days.

(21) Appl. No.: 17/967,553

(22) Filed: Oct. 17, 2022

(65) Prior Publication Data
US 2023/0347967 A1 Nov. 2, 2023

(30) Foreign Application Priority Data
Apr. 28, 2022 (KR) .................. 10-2022-0052852

(51) Int. Cl.
*B62D 1/10* (2006.01)
*B60R 21/20* (2011.01)
(Continued)

(52) U.S. Cl.
CPC .............. *B62D 1/10* (2013.01); *B60R 21/203* (2013.01); *B62D 1/183* (2013.01)

(58) Field of Classification Search
CPC . B62D 1/10; B62D 1/11; B62D 1/181; B62D 1/183; B62D 1/187; B60R 21/2023
See application file for complete search history.

(56) References Cited

U.S. PATENT DOCUMENTS 4,228,695 A 10/1980 Trevisson et al.
5,653,146 A 8/1997 Barton
(Continued)

FOREIGN PATENT DOCUMENTS

CN 106627724 B 3/2019
DE 10315385 A1 * 10/2004 ............. B62D 1/183
(Continued)

*Primary Examiner* — Adam D Rogers
(74) *Attorney, Agent, or Firm* — MORGAN, LEWIS & BOCKIUS LLP

(57) ABSTRACT

A foldable steering wheel is configured to be folded or unfolded due to linear movement and rotating movement of the steering wheel to secure an available space in a driver's seat, and the foldable steering wheel includes an armature body connected to a column, the steering wheel coupled to the armature body, configured to be linearly moved in a radial direction with respect to a steering shaft of the column, and configured to be rotatably moved on a rotation shaft which is unparallel to the steering shaft, and a moving device engaged to the steering wheel and configured to generate a linear movement path and a rotating movement path of the steering wheel to move the steering wheel with respect to the armature body.

18 Claims, 12 Drawing Sheets

(51) Int. Cl.
 B62D 1/18 (2006.01)
 B60R 21/203 (2006.01)
 B62D 1/183 (2006.01)

(56) References Cited

U.S. PATENT DOCUMENTS

| | | | | |
|---|---|---|---|---|
| 8,117,940 | B2 * | 2/2012 | Andersson | B62D 1/187 |
| | | | | 74/495 |
| 8,899,623 | B2 * | 12/2014 | Stadler | B62D 5/001 |
| | | | | 280/775 |
| 10,793,178 | B1 * | 10/2020 | del Toro Reyna | B62D 1/11 |
| 11,124,219 | B2 * | 9/2021 | Hansen | G05D 1/021 |
| 11,142,235 | B2 * | 10/2021 | Watanabe | B62D 1/187 |
| 11,292,503 | B2 * | 4/2022 | Jo | B60W 60/005 |
| 2009/0321171 | A1 | 12/2009 | Hakansson | |
| 2021/0078625 | A1 * | 3/2021 | Yamazaki | B62D 1/10 |
| 2021/0316777 | A1 | 10/2021 | Kwon | |

FOREIGN PATENT DOCUMENTS

| | | | | |
|---|---|---|---|---|
| DE | 102018208665 | A1 * | 12/2019 | B62D 1/183 |
| KR | 20-0463258 | Y1 | 10/2012 | |
| KR | 10-2183411 | | 11/2020 | |

* cited by examiner

Linear movement

FOLDABLE STEERING WHEEL

CROSS REFERENCE TO RELATED APPLICATION

The present application claims priority to Korean Patent Application No. 10-2022-0052852, filed Apr. 28, 2022, the entire contents of which is incorporated herein for all purposes by this reference.

BACKGROUND OF THE PRESENT DISCLOSURE

Field of the Present Disclosure

The present disclosure relates to a foldable steering wheel configured to be operated to be folded or unfolded by linear movement and rotating movement of the steering wheel to secure a space in a driver's seat.

Description of Related Art

The steering wheel is a steering device that controls a direction of driving of a vehicle, and during vehicle driving, a driver holds the steering wheel to drive the vehicle in a desired direction of the driver.

However, although steering of the vehicle is not required when the vehicle is stopped and not driving, there is a problem in that the driver cannot secure an available space due to the steering wheel placed in an initial location, and thus the spatial utilization of the vehicle room is degraded.

An easy excess mode in which the steering wheel is moved upward or a seat is moved rearward when the driver boards the vehicle is being applied.

However, a rim portion of the steering wheel takes up a lot of space in the driver's seat, and during electric vehicle charging or autonomous driving of a vehicle, the spatial utilization of the driver is degraded due to the rim portion of the steering wheel in the driver's seat.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable steering wheel configured to be folded or unfolded due to linear movement and rotating movement of the steering wheel to secure a space in a driver's seat.

In various aspects of the present disclosure, there is provided a foldable steering wheel including: an armature body fixed to a column; the steering wheel coupled to the armature body, configured to be linearly moved in a radial direction with respect to a steering shaft of the column, and configured to be rotatably moved on a rotation shaft which may be unparallel to the steering shaft; and a moving device engaged to the steering wheel and configured to generate a linear movement path and a rotating movement path of the steering wheel to move the steering wheel with respect to the armature body.

The rotation shaft may be orthogonal at a right angle to the steering shaft.

The steering wheel may be configured to be linearly moved downward, and a lower end portion of the steering wheel may be rotated on the rotation shaft, which may be provided in leftward and rightward directions of the armature body, toward a lower portion of a cockpit.

The steering wheel may be configured to be folded by being rotated after being linearly moved.

While an airbag module is fixed to the armature body to fix a location of the airbag module to the armature body, only the steering wheel may be moved.

The moving device may include: a plurality of gear members gear-engaged to each other between the armature body and the steering wheel; and a guide device configured to guide the steering wheel to move along the linear movement path and the rotating movement path of the steering wheel.

The foldable steering wheel may include: a driving portion configured to supply a rotary driving force to the gear members coupled to the armature body.

The plurality of gear members may include: a rotation gear rotatably coupled to a side portion of the armature body; and a shift gear fixed to a side portion of a rim assembly fixed in the steering wheel, and engaged with the rotation gear while being extended along a first direction in which the steering wheel is linearly moved and along a second direction bent toward one side from the first direction.

A first tooth portion may be formed on a part of a circumference of the rotation gear, and in the circumference, a rotating matching portion may be formed on a portion connected to the first tooth portion; and a second tooth portion engaged with the first tooth portion may be formed, in the first direction, on a portion of an edge portion of the shift gear facing the rotation gear, and a moving matching portion having a shape corresponding to a shape of the rotating matching portion may be formed on a bent portion where the second direction is bent from and may be connected to the first direction.

The second tooth portion may be configured to be moved along the first tooth portion and thus the steering wheel may be linearly moved, and while the rotating matching portion and the moving matching portion match with each other, the rotation gear may be rotated, and thus the steering wheel may be rotated on the rotation shaft of the rotation gear.

A first tooth portion may be formed along a circumference of the rotation gear; and a second tooth portion may be formed along edge portions in the first direction and the second direction of the shift gear facing the rotation gear, and the second tooth portion may be engaged with the first tooth portion.

The guide device may include: a guide protrusion fixed on a side portion of the armature body; and a guide groove formed in the shift gear, wherein the guide groove may be a linear guide slot and a curved guide slot formed along paths in which the steering wheel may be linearly and rotatably moved, so that the guide protrusion may be inserted thereinto.

The linear guide slot and the curved guide slot may be continuously connected to each other.

A foldable steering wheel may be configured to be rotated on a rotation shaft arranged unparallel to a steering shaft after being linear moved.

The steering wheel may be configured to be linearly moved in one of radial directions of a circle centered on a steering shaft of a column; and the steering wheel may be configured to be rotated on the rotation shaft orthogonal to the steering shaft.

The steering wheel may be configured to be linearly moved downward, and configured so that a lower end portion of the steering wheel may be rotated on the rotation shaft toward a lower portion of a cockpit.

After rotation of the steering wheel, a rim portion of the steering wheel may be located parallel to a lower end portion of a shroud, so that the steering wheel may be folded without interfering with the shroud.

A foldable steering wheel may be configured to be rotatably moved on a shaft arranged unparallel to a column after being linearly moved in a direction.

By the above-described technical solution, the foldable steering wheel of the present disclosure is operated so that the steering wheel is folded while the rim portion of the steering wheel enters the inside space of the cockpit, so that an available space may be secured in the driver's seat. Therefore, an available space is secured in the driver's seat in autonomous driving when the driver boards the vehicle or the vehicle is stopped, whereby there is an effect that spatial utilization and convenience in the vehicle room are improved.

Furthermore, even when the linear movement and the rotating movement of the steering wheel are performed, the airbag module remains in a fixed state, so that there is an advantage in that the unfolding performance of the airbag of the driver's seat is maintained and the safety of a passenger in the driver's seat is secured even in a folded state of the steering wheel.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
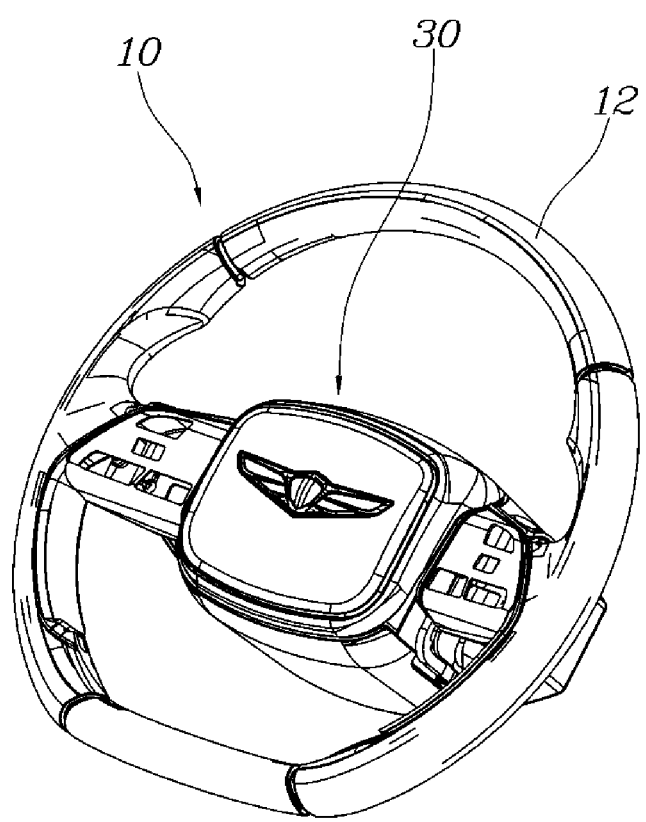
FIG. 1 is a view showing a steering wheel according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are shown in the drawings and will be described in detail in the present specification. However, it should be understood that the exemplary embodiments according to the concept of the present disclosure are not limited to the exemplary embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" should be interpreted in a same manner as those described above.

The terminology used herein is for describing various exemplary embodiments only and is not intended to limit the present disclosure. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

According to the exemplary embodiment of the present disclosure, a controller may be realized by a nonvolatile memory, which includes an algorithm configured to control operations of various components of a vehicle or data regarding software instructions to play the algorithm, and a processor, which is configured to perform operations described below using the data stored in the memory. The memory and processor may be realized as separate chips. Alternately, the memory and processor may be realized as an integrated single chip. The processor may have one or more forms.

Hereinbelow, various exemplary embodiments of the present disclosure will be described in detail with reference accompanying drawings.

Figure 2:
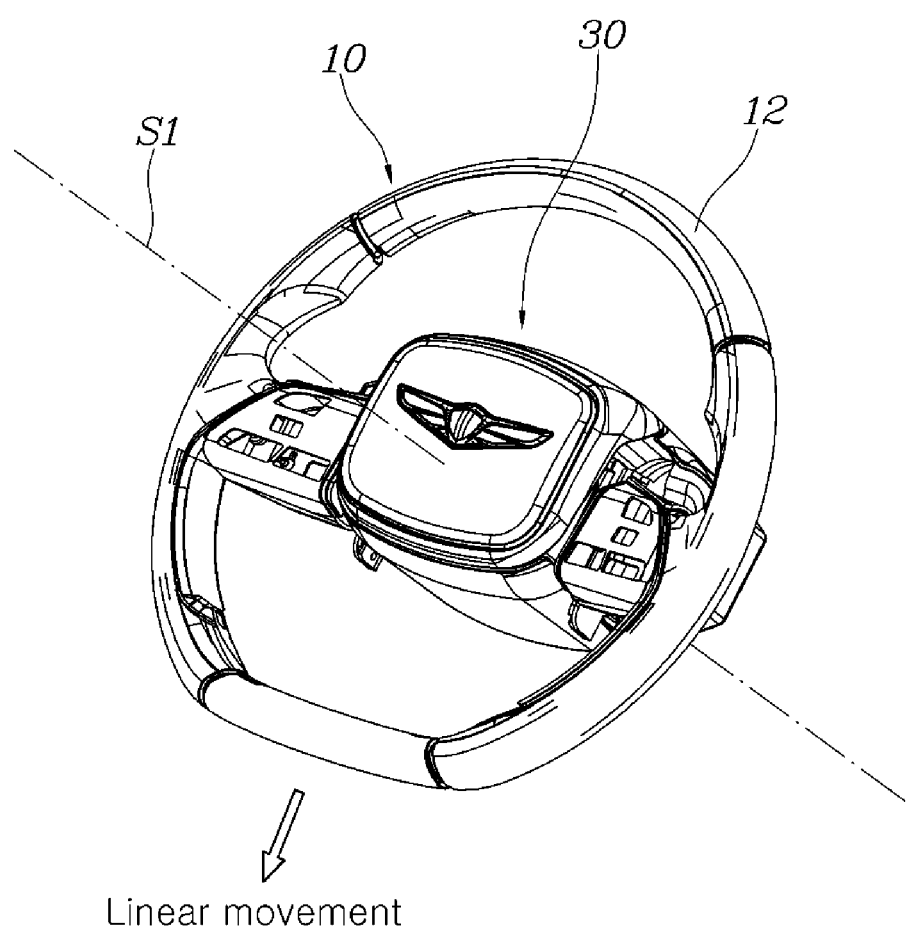
FIG. 2 is a view showing the steering wheel in FIG. 1 that has been linearly moved.
Figure 3:
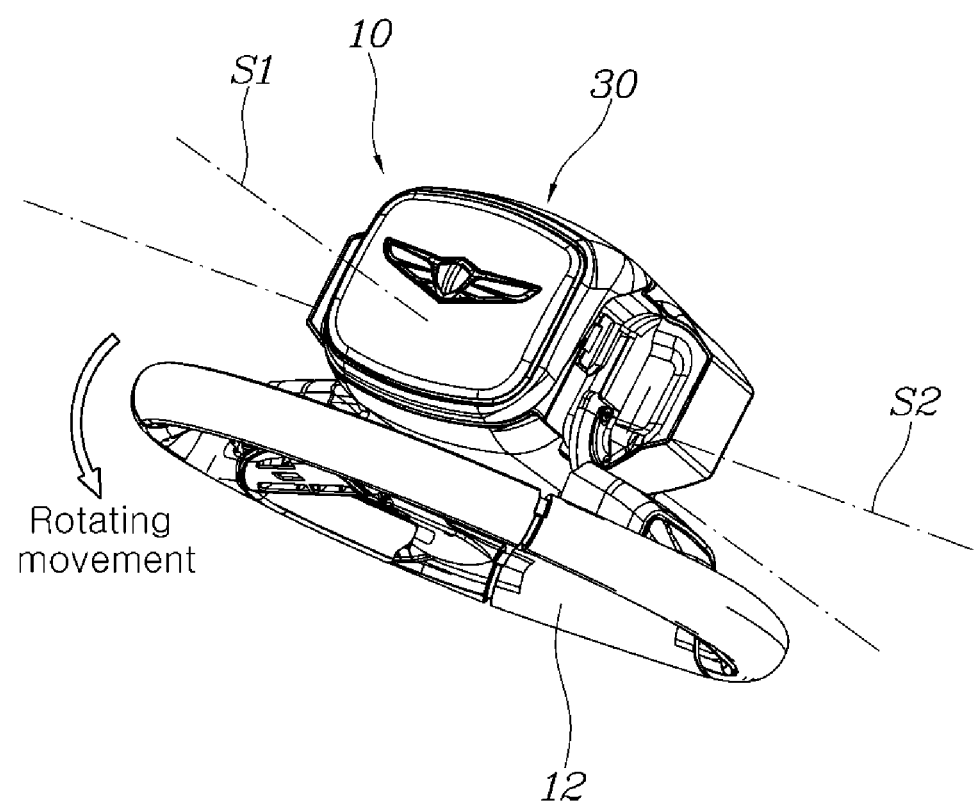
FIG. 3 is a view showing the steering wheel in FIG. 2 that has been rotatably moved.

FIG. 1 is a view showing a steering wheel 10 according to an exemplary embodiment of the present disclosure. FIG. 2 is a view showing the steering wheel 10 in FIG. 1 that has been linearly moved. FIG. 3 is a view showing the steering wheel 10 in FIG. 2 that has been rotatably moved.

Referring to the drawings, the foldable steering wheel 10 in an exemplary embodiment of the present disclosure includes: an armature body 20 connected to a column 21; the steering wheel 10 connected to the armature body 20, linearly moved in a radial direction with respect to a steering shaft S1 of the column 21, and rotatably moved on a rotation shaft S2 arranged unparallel to the steering shaft S1; and a moving device generating a linear movement path and a rotating movement path of the steering wheel 10 to move the steering wheel 10 against the armature body 20.

The rotation shaft S2 may be formed in a direction orthogonal to the steering shaft S1.

For example, the column 21 is coupled to a center lower portion of the armature body 20 and then is mounted to a vehicle. The steering shaft S1 is a shaft of the column 21 as a center shaft in which steering rotation of the steering wheel 10 is performed.

Accordingly, the rotation shaft S2 orthogonal to the steering shaft S1 is a shaft formed in leftward and rightward directions of the armature body 20.

The moving device is provided between the armature body 20 and the steering wheel 10, and mechanically connect the armature body 20 to the steering wheel 10 to generate the paths along which the steering wheel 10 is linearly and rotatably moved.

In other words, the steering wheel 10 is linearly moved in any one of radial directions of a circle centered on the steering shaft S1 of the column 21, and then the steering wheel 10 is rotatably moved in one direction on the transverse rotation shaft S2.

The steering wheel 10 is linearly moved downward, and a lower end portion of the steering wheel 10 is rotated on the rotation shaft S2 provided transversally of the armature body 20 toward a lower portion of a cockpit 50.

In other words, as the steering wheel 10 in the state in FIG. 1 is linearly moved downward on the steering shaft S1, the steering wheel 10 is linearly moved downward as shown in FIG. 2.

Figure 5:
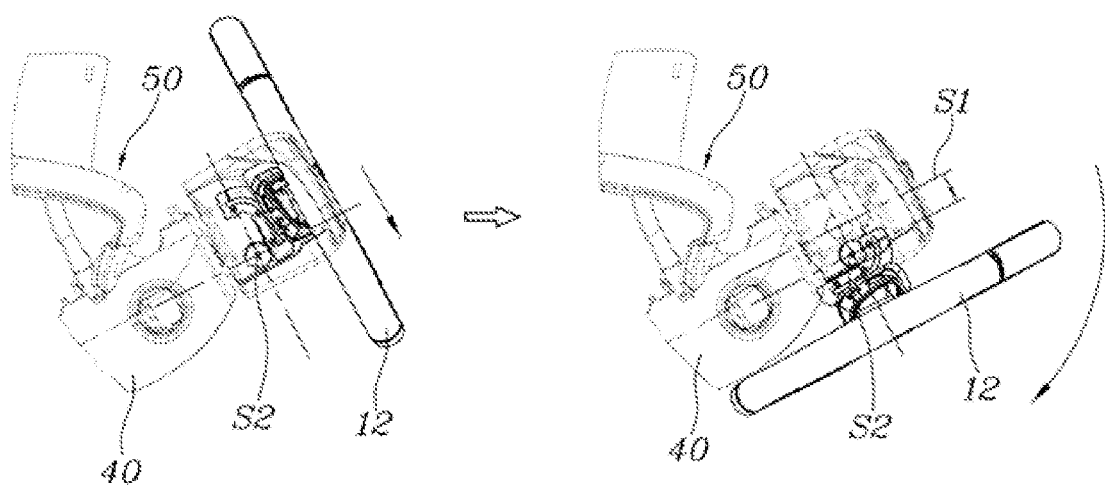
FIG. 5 is a view showing a situation in which the steering wheel according to an exemplary embodiment of the present disclosure is folded without interference between the steering wheel and the vehicle body when the steering wheel is rotatably moved after linear movement thereof.

Accordingly, as the lower end portion of the steering wheel 10 is rotated on the rotation shaft S2 toward a lower portion of the vehicle, a rim portion 12 of the steering wheel 10 is folded while entering the inside space of the cockpit 50, as shown in FIGS. 3 and 5.

Furthermore, according to an exemplary embodiment of the present disclosure, the steering wheel 10 is folded by being rotatably moved after linear movement thereof. Of course, when the steering wheel 10 is unfolded, contrary to the above described operation, the steering wheel 10 is linearly moved after rotating movement thereof.

Figure 4:
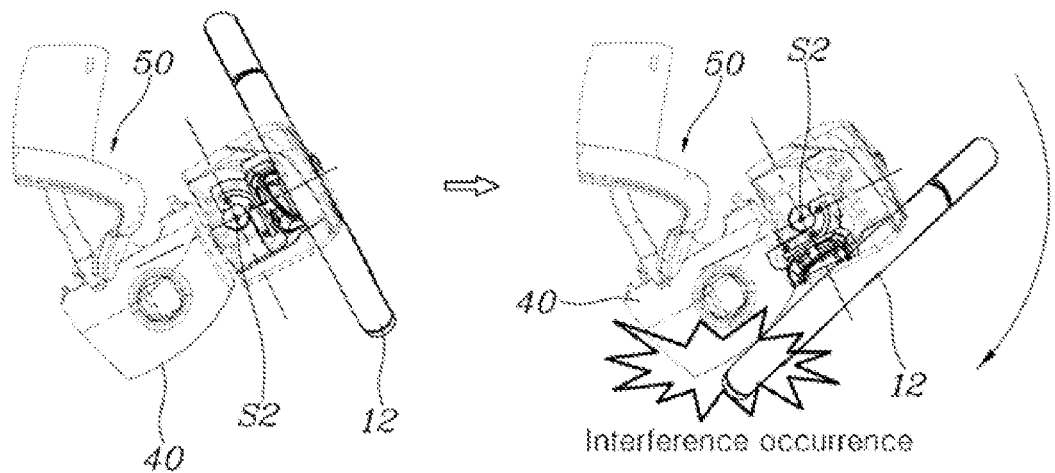
FIG. 4 is a view showing a situation in which interference between the steering wheel and a vehicle body occurs when the steering wheel is rotatably moved without being linearly moved.

FIG. 4 is a view showing a situation in which interference between the steering wheel 10 and a vehicle body occurs when the steering wheel 10 is rotatably moved without being linearly moved. FIG. 5 is a view showing a situation in which the steering wheel 10 according to an exemplary embodiment of the present disclosure is folded without interference between the steering wheel and the vehicle body when the steering wheel is rotatably moved after linear movement thereof.

Referring to the drawings, according to an exemplary embodiment of the present disclosure, the steering wheel 10 is moved in any one direction on the steering shaft S1 of the column 21, and then is rotatably moved in one direction on the transverse rotation shaft S2 arranged unparallel to the steering shaft S1.

Herein, the linear movement of the steering wheel 10 is performed in a downward direction among radial directions of the circle centered on the steering shaft S1 of the column 21.

Accordingly, the rotating movement of the steering wheel 10 is performed so that the lower end portion of the steering wheel 10 is rotated on the rotation shaft S2 arranged orthogonal to the steering shaft S1 toward the lower portion of the cockpit 50.

According to the present configuration, after rotation of the steering wheel 10, the rim portion 12 of the steering wheel 10 is located parallel to a lower end portion of a shroud 40, and thus the steering wheel 10 is folded without interfering with the shroud 40.

Describing a reason for downward linear movement of the steering wheel 10 performed before rotating movement the steering wheel 10, the shroud 40 mounted to the cockpit 50 is configured as a cover covering a lower portion of the column 21, and as shown in FIG. 4, when the steering wheel 10 is only rotated without being linearly moved downward, the rim portion 12 at a lower end portion of the steering wheel 10 interferes with the shroud 40.

However, as shown in FIG. 5, when the steering wheel 10 is rotated after being linearly moved downward at a predetermined distance, the rim portion 12 at the lower end portion of the steering wheel 10 does not interfere with the shroud 40 so that the steering wheel 10 is stably folded.

Therefore, because it is possible to secure an available space in a driver's seat as the steering wheel 10 is folded, an available space is secured in the driver's seat when a driver board the vehicle or the vehicle is stopped, and thus the spatial utilization and convenience in the vehicle room are improved.

Furthermore, according to an exemplary embodiment of the present disclosure, an airbag module 30 is fixed to the armature body 20, and only the steering wheel 10 may be moved while a location of the airbag module 30 is fixed.

Figure 6:
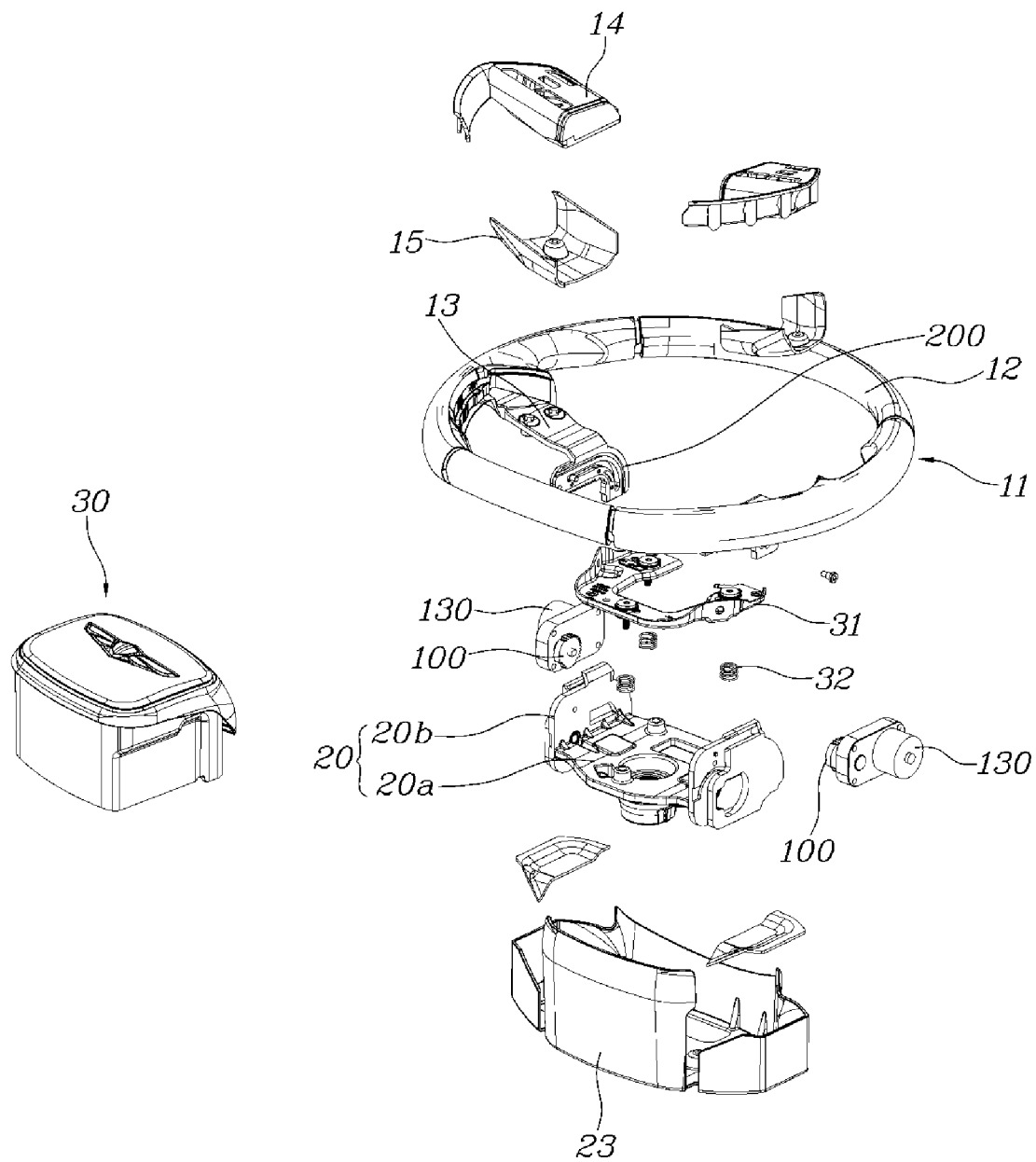
FIG. 6 is an exploded-perspective view showing the steering wheel according to an exemplary embodiment of the present disclosure.
Figure 7:
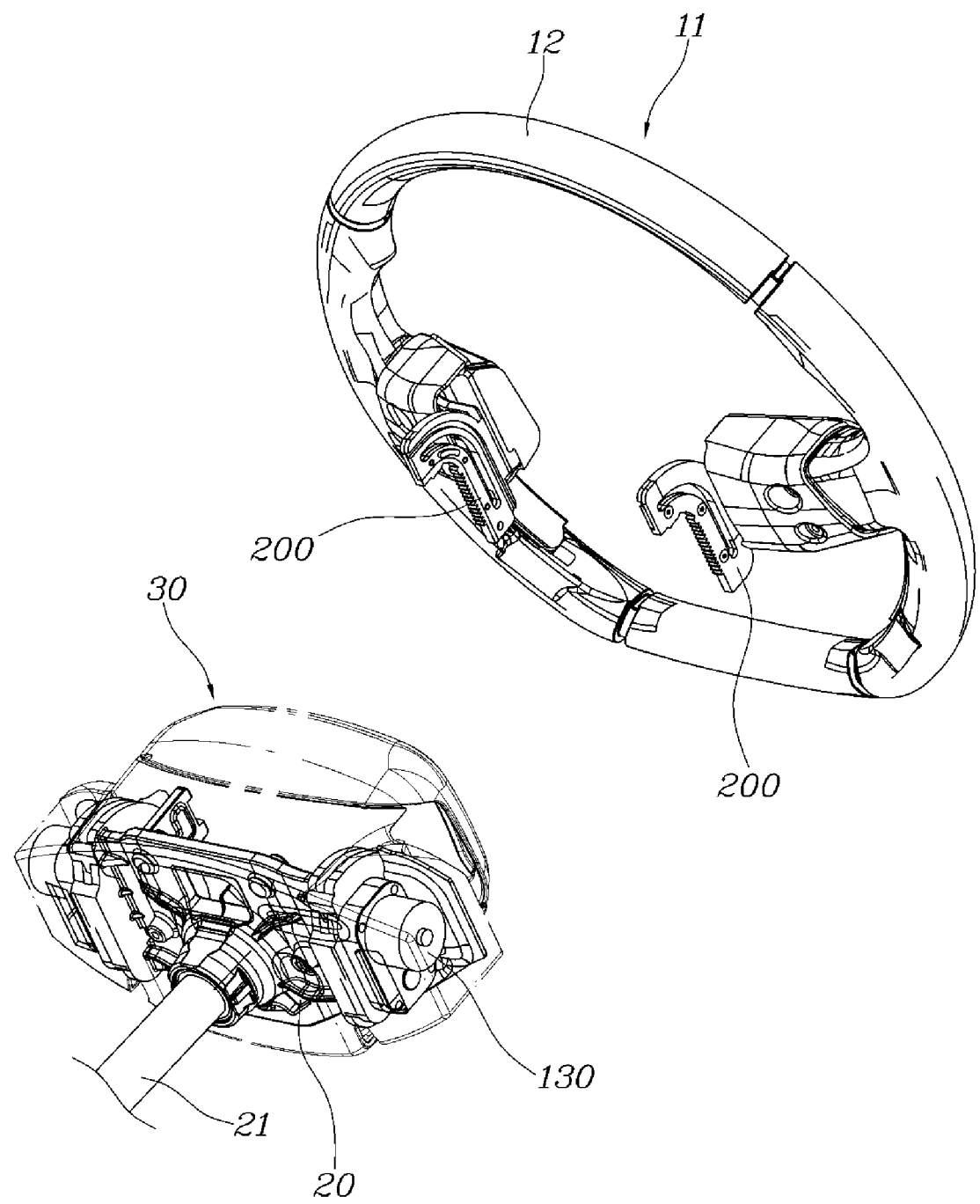
FIG. 7 is a view showing an armature body and a rim assembly according to an exemplary embodiment of the present disclosure that are separated from each other.

FIG. 6 is an exploded-perspective view showing the steering wheel 10 according to an exemplary embodiment of the present disclosure. FIG. 7 is a view showing the armature body 20 and a rim assembly 11 according to an exemplary embodiment of the present disclosure that are separated from each other.

Describing the present disclosure with reference to the drawings, the armature body 20 includes a plate-shaped supporting portion 20a formed at a center portion of the armature body 20, and connection portions 20b provided at opposite sides of the supporting portion 20a, so that the armature body 20 has a 'U'-shaped section. Accordingly, the airbag module 30 is fixed to an upper surface of the supporting portion 20a.

A horn plate 31 is assembled between the supporting portion 20a and the airbag module 30 to sound a horn at a press of the airbag module 30, and recover the airbag module 30, by springs 32, to a state before the press of the airbag module 30.

Accordingly, the armature body 20 is connected to the steering wheel 10 by the moving device, so that the steering wheel 10 is linearly and rotatably moved against the armature body 20.

Therefore, even when linear movement and rotating movement of the steering wheel 10 are performed, the airbag module 30 is fixed to the armature body 20, so that a location of the airbag module 30 is not changed. Accordingly, unfolding performance of the airbag of the driver's seat may be maintained as it is even in a folded state of the steering wheel 10, ensuring the safety of a passenger in the driver's seat.

Figure 8:
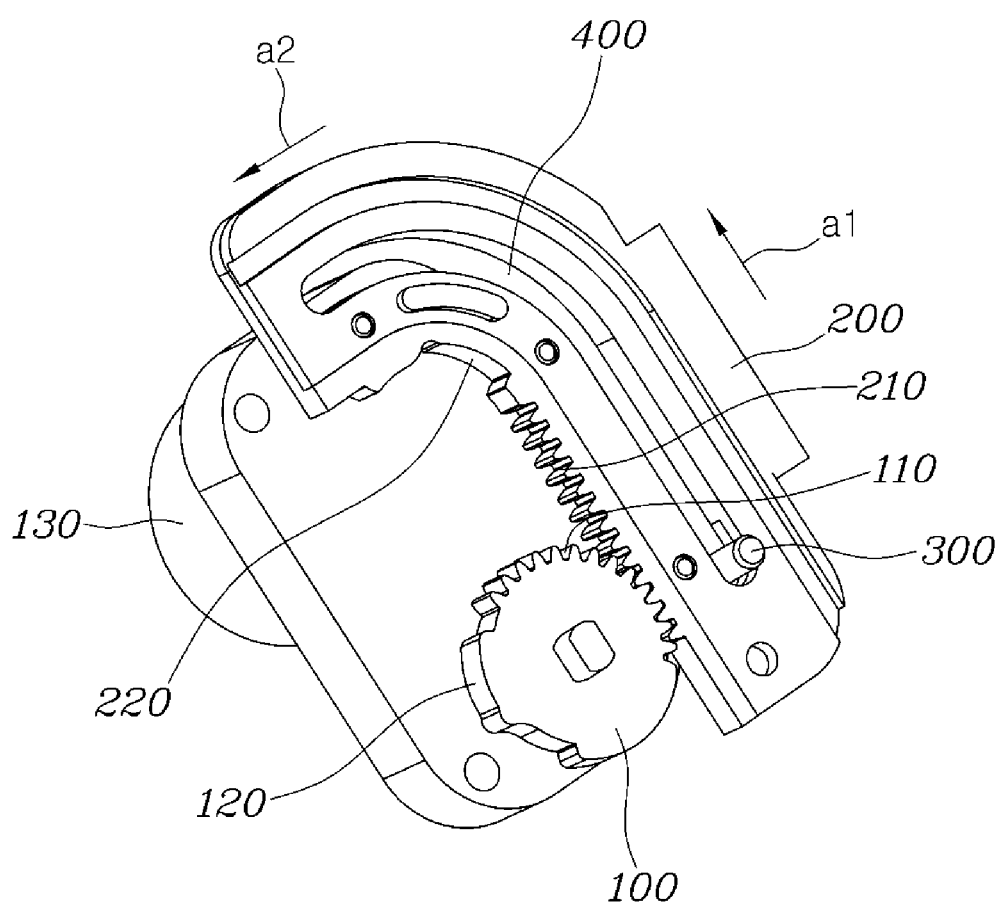
FIG. 8 is an enlarged view showing a rotation gear and a shift gear according to various exemplary embodiments of the present disclosure.

Meanwhile, FIG. 8 is an enlarged view showing a rotation gear 100 and a shift gear 200 according to various exemplary embodiments of the present disclosure.

Referring to the drawing, the moving device includes: a plurality of gear members coupled to each other between the armature body 20 and the steering wheel 10 in a gear engagement structure; and a guide device guiding a movement of the steering wheel 10 along the linear guide slot 410 and the curved guide slot 420 of the steering wheel 10.

Figure 9:
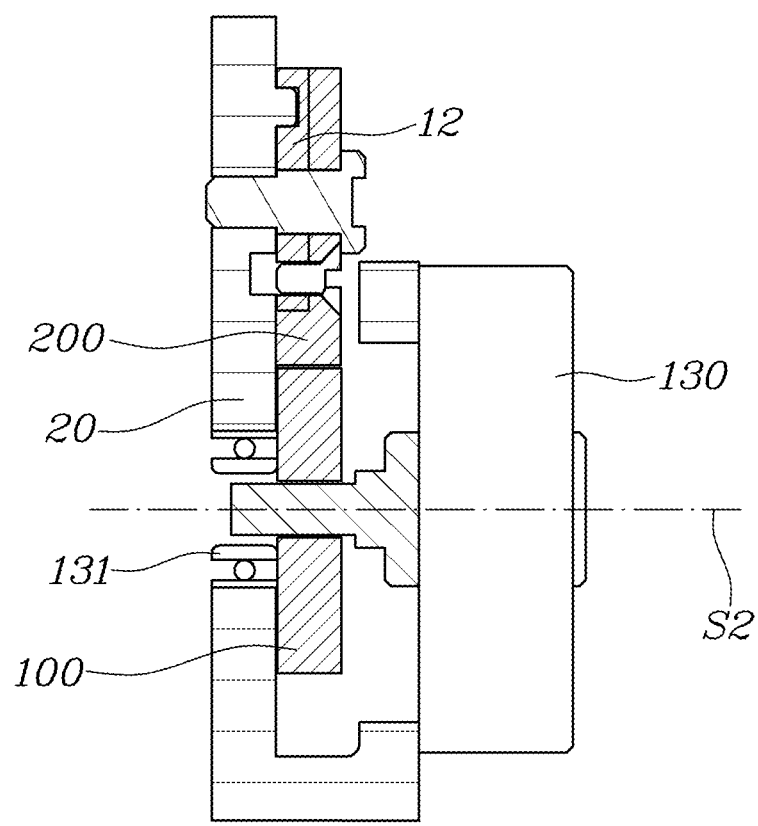
FIG. 9 is a view showing a coupling structure of a driving portion according to an exemplary embodiment of the present disclosure.

Furthermore, FIG. 9 is a view showing a coupling structure of a driving portion 130 according to an exemplary embodiment of the present disclosure. The foldable steering wheel of the present disclosure includes the driving portion 130 providing a rotary driving force to the gear members provided in the armature body 20.

For example, the driving portion 130 may be a motor, and is provided in a gear box form and is assembled at a side portion of the armature body 20.

The rotation gear 100 is provided at the armature body 20, and the shift gear 200 is provided at the rim assembly 11. The configuration of the rotation gear 100 and the shift gear 200 will be described in detail below.

The motor is assembled to the rotation gear 100 and a rotation shaft S2 of the motor is configured as the rotation shaft S2 of the rotation gear 100. Herein, the rotation shaft S2 of the motor is supported by the armature body 20 in an insertion manner by a bearing 131 to prevent the rotation gear 100 form shaking.

Furthermore, the motor may be assembled to each of opposite sides of the armature body 20, and alternatively, only one motor may be assembled to the rotation gear 100 by being provided at a center portion of the armature body 20.

A controller is configured to control operation of the motor.

The rotary driving force of the motor is provided to the rotation gear 100 to rotate the rotation gear 100, and as the rotation gear 100 is rotated, the rotary driving force is transmitted to the shift gear 200 engaged with the rotation gear 100 to move the shift gear 200. Therefore, folding or unfolding operation the steering wheel 10 is implemented in response to operation of the motor.

The gear members include: the rotation gear 100 rotatably coupled to a side portion of the armature body 20; and the shift gear 200 fixed to a side portion of the rim assembly 11 provided in the steering wheel 10, and engaged with the rotation gear 100 while being extended along a first direction a1 in which the steering wheel 10 is linearly moved and a second direction a2 bent toward one direction from the first direction a1.

Describing in detail with reference to FIGS. 6 to 8, the rotation gear 100 has gear teeth formed along a circumference thereof and is formed in an external gear rotated on the rotation shaft S2 at the center portion thereof.

The rotation gear 100 is rotatably provided at a side surface of each of the connection portions 20b provided at the opposite portions of the armature body 20.

Accordingly, the rim assembly 11 is provided by a spoke portion 13 fixed from an internal surface of the rim portion 12 toward the armature body 20. The rim portion 12 may be formed in a general circular shape made of leather and foam, but may be formed in a yoke steering wheel and in various other shapes.

The shift gear 200 is formed in a 'L'-shape along the first direction a1 and the second direction a2, and a first end portion thereof is securely bolted to an end portion of the spoke portion 13, and a second end portion thereof is engaged with the rotation gear 100. For reference, the shift gear 200 is manufactured in a separate object from the spoke portion 13 and the shift gear 200 and the spoke portion 13 may be fixed to each other by bolting, and the shift gear 200 and the spoke portion 13 may be integrally formed with each other.

Therefore, in a state where the shift gear 200 is engaged with the rotation gear 100, movement of the shift gear 200 is guided by the guide device along the linear guide slot 410 and the curved guide slot 420.

In other words, when the rotation gear 100 is rotated by the driving portion 130, the shift gear 200 is moved along the linear movement path 400a and the rotating movement path 400b generated from the guide device, and the steering wheel 10 fixed to the shift gear 200 is linearly moved and rotated with the shift gear 200.

For reference, a switch assembly 14 is assembled to the spoke portion 13, and a switch cover 15 may be assembled to the switch assembly 14 to protect a lower external form of the switch assembly 14. Accordingly, to protect an external form of the armature body 20, a body cover 23, etc. may be assembled to the armature body 20 in a covering manner.

Figure 10:
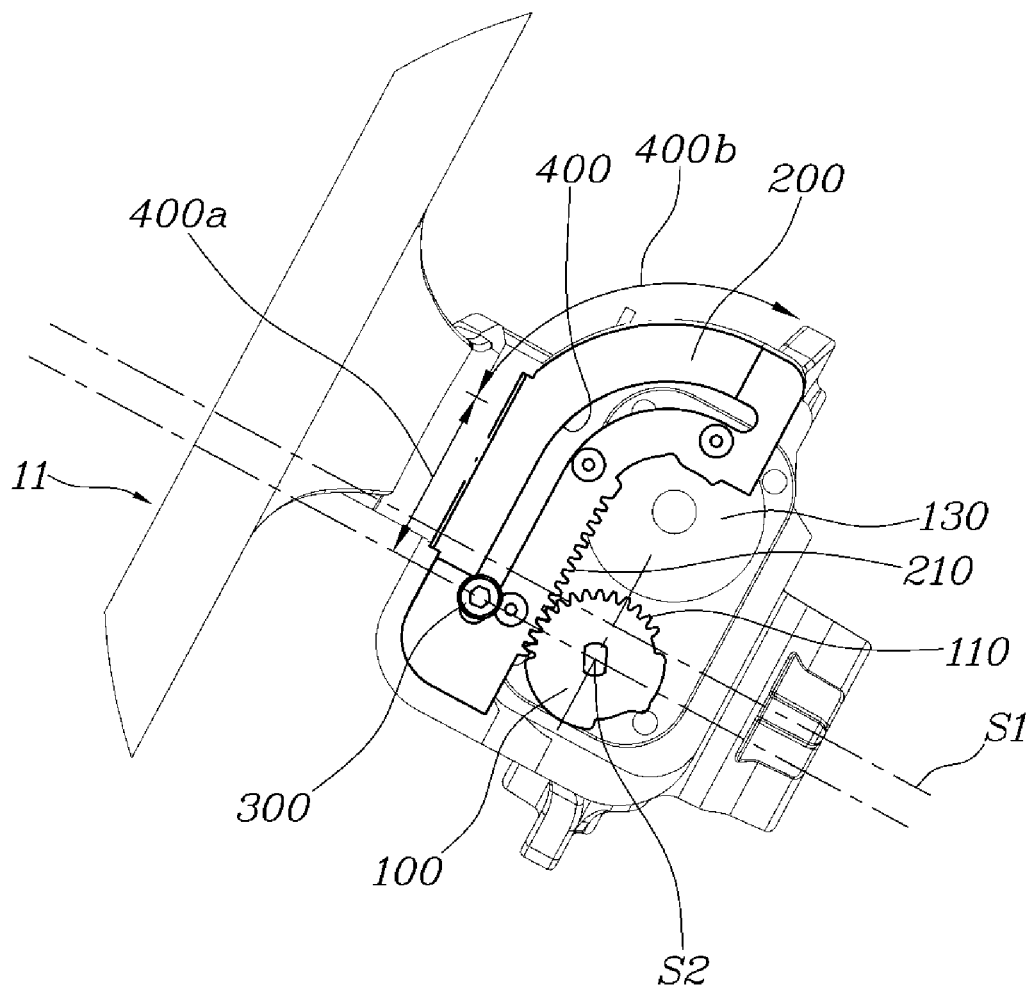
FIG. 10, FIG. 11, and FIG. 12 are views showing operational relation between the rotation gear and the shift gear in a process of linear and rotating movements of the steering wheel according to an exemplary embodiment of the present disclosure.
Figure 11:
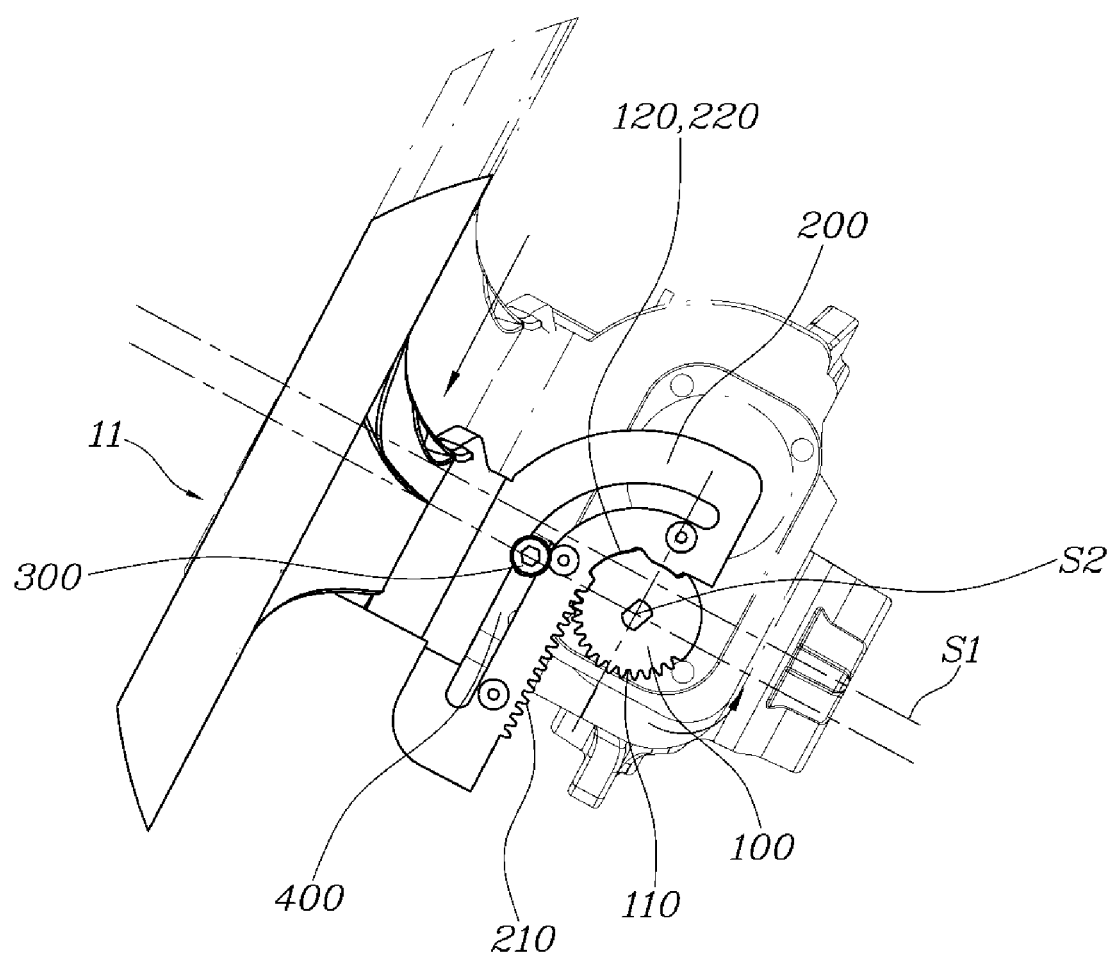
Figure 12:
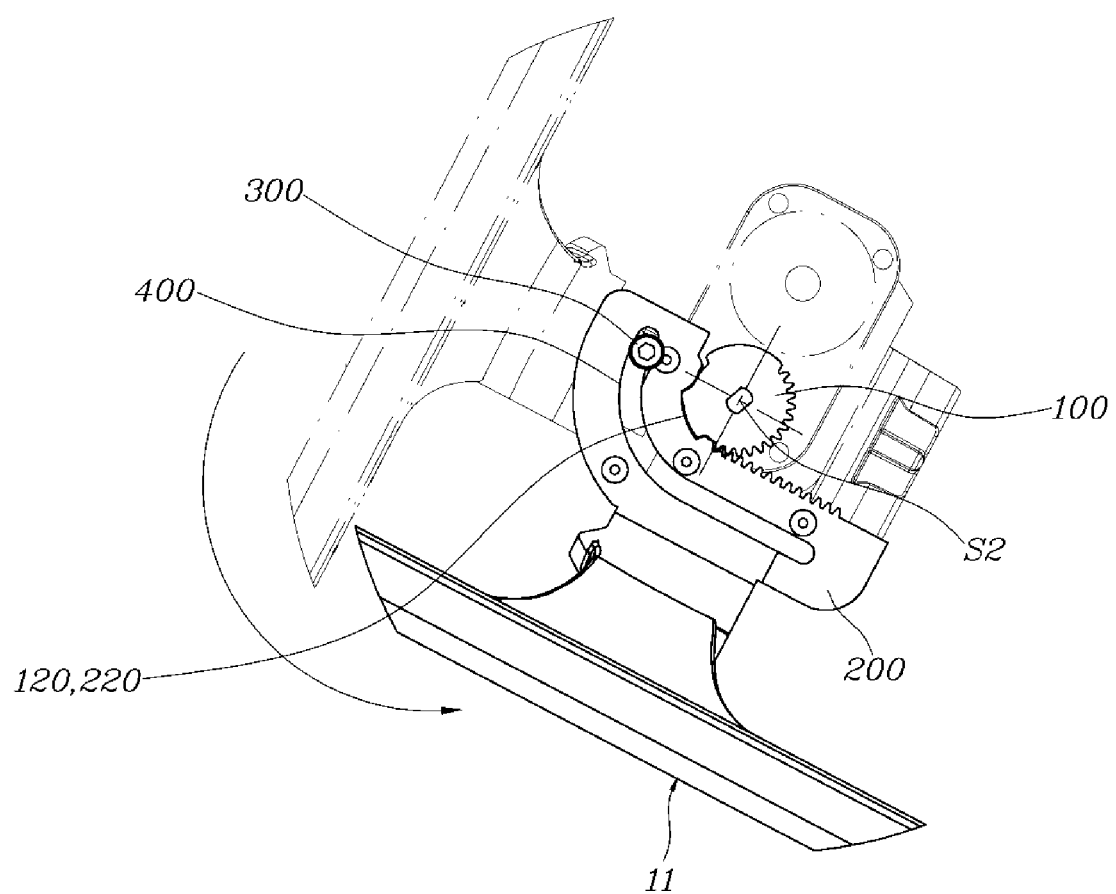

FIG. 10, FIG. 11, and FIG. 12 are views showing operational relation between the rotation gear 100 and the shift gear 200 in a process of linear movement and rotating movement of the steering wheel 10 according to an exemplary embodiment of the present disclosure.

Referring to the drawings, a first tooth portion 110 is formed on a portion of the circumference of the rotation gear 100, and on the circumference, a rotating matching portion 120 is formed on a portion connected to the first tooth portion 110; a second tooth portion 210 is formed in an edge portion of the shift gear 200 facing the rotation gear 100 to be engaged with the first tooth portion 110 along the first direction a1, and a moving matching portion 220 having a shape corresponding to a shape of the rotating matching portion 120 may be formed in a bent portion where the first direction a1 is connected to the second direction a2.

The rotation gear 100 is formed in a sector gear, and the first tooth portion 110 is formed along a part of the circumference of the rotation gear 100. The rotating matching portion 120 of a protrusion shape is formed along a part of the circumference of the rotation gear 100, the part bordering the first tooth portion 110.

Accordingly, the second tooth portion 210 including a rack gear is formed on one surface in the first direction a1 of the shift gear 200 facing the rotation gear 100, and the moving matching portion 220 including a groove shape corresponding to the rotating matching portion 120 is formed on one surface in the second direction a2 bordering the one surface in the first direction a1.

Accordingly, the second tooth portion 210 is linearly moved along the first tooth portion 110, linearly moving the steering wheel 10, and while the rotating matching portion 120 and the moving matching portion 220 match with each other, the rotation gear 100 is rotated, rotating the steering wheel 10 on the rotation shaft S2 of the rotation gear 100.

In other words, when the motor is operated in one direction in a situation of FIG. 10, the rotation gear 100 is rotated on the rotation shaft S2 in conjunction with the motor. Herein, the second tooth portion 210 of the shift gear 200 is engaged with the first tooth portion 110 of the rotation gear 100, so that the shift gear 200 is linearly moved downward together with the rim assembly 11 as shown in FIG. 11, and the rotating matching portion 120 and the moving matching portion 220 match with each other.

As described above, while the rotating matching portion 120 and the moving matching portion 220 match with each other, as the driving force of the motor continues to be applied, the rotation gear 100 rotates the shift gear 200. Therefore, as shown in FIG. 12, a rim assembly 11 is rotated in the form in which.

Figure 13:
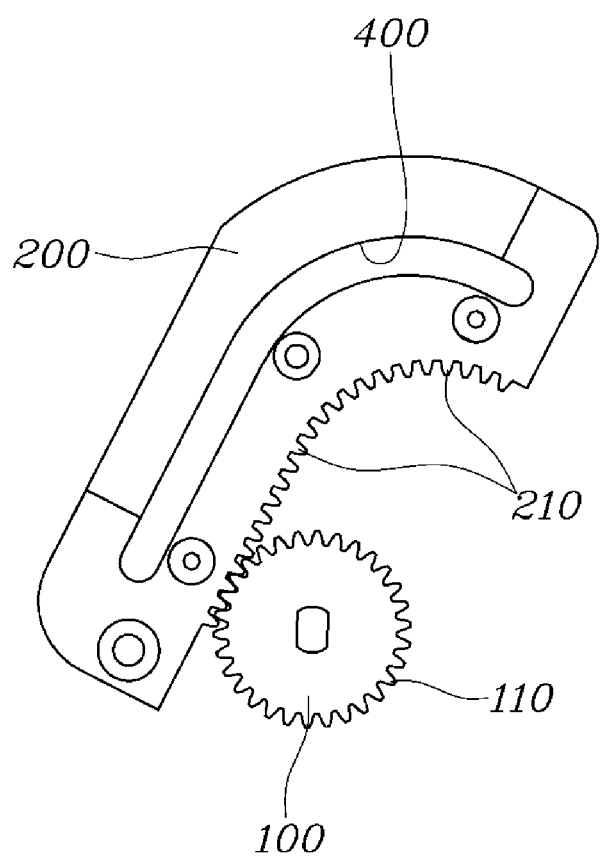
FIG. 13 is an enlarged view showing the rotation gear and the shift gear according to various exemplary embodiments of the present disclosure.

Meanwhile, FIG. 13 is an enlarged view showing the rotation gear 100 and the shift gear 200 according to various exemplary embodiments of the present disclosure.

Referring to the drawing, the first tooth portion 110 may be formed along the circumference of the rotation gear 100; and the second tooth portion 210 may be formed along the edge portions in the first direction a1 and the second direction a2 of the shift gear 200 facing the rotation gear 100, and the second tooth portion 210 may be engaged with the first tooth portion 110.

The rotation gear 100 is formed in a pinion gear and has the first tooth portion 110 along the circumference thereof.

Accordingly, the second tooth portion 210 having a rack gear shape is formed on one surface in the first direction a1 of the shift gear 200 facing the rotation gear 100, and on one surface in the second direction a2 bordering the one surface in the first direction a1, and the second tooth portion 210 is also formed at a corner between the first direction a1 and the second direction a2 of the shift gear 200.

Meanwhile, as shown in FIGS. 6 to 8, the guide device includes: a guide protrusion 300 fixed to a side portion of the armature body 20; and a guide groove 400 formed in the shift gear 200 with having the linear movement path 400a and the rotating movement path 400b, which are formed in long holes, formed along the paths in which the steering wheel 10 is linearly moved and rotatably moved, so that the guide protrusion 300 is inserted into the guide groove 400.

Furthermore, the linear movement path 400a and the rotating movement path 400b are continuously connected to each other.

The guide protrusion 300 securely protrudes on a side surface of the armature body 20, which is adjacent to the rotation gear 100.

Accordingly, the 'L'-shaped guide groove 400, in which the linear movement path 400a and the rotating movement path 400b are continuously connected, is formed in a center portion of the shift gear 200 formed in the 'L' shape in a longitudinal direction thereof, and the guide protrusion 300 is inserted into the guide groove 400.

Therefore, when the shift gear 200 is moved by rotation of the rotation gear 100, as shown in FIGS. 10 and 12, the guide protrusion 300 guides the linear movement of the shift gear 200 along the linear movement path 400a of the guide groove 400, so that the linear movement of the shift gear 200 is implemented.

Accordingly, in a portion where the linear movement path 400a is converted into the rotating movement path 400b, the guide protrusion 300 guides the rotating movement of the shift gear 200 along the rotating movement path 400b of the guide groove 400, so that the rotating movement of the shift gear 200 is implemented.

Hereinbelow, application and effect in response to operation of the foldable steering wheel 10 according to an exemplary embodiment of the present disclosure will be described.

As shown in FIG. 1, when a driving situation is changed from a normal driving situation where the steering wheel 10 is unfolded toward the driver to a driving situation in which the steering wheel 10 should be folded like an autonomous driving mode, the controller orders an operation signal to the motor to rotate the motor.

When the motor is rotated, based on FIG. 10, the driving force of the motor is transmitted to the rotation gear 100, so that the rotation gear 100 is rotated counterclockwise.

Accordingly, because the guide protrusion 300 is inserted in the linear movement path 400a of the guide groove 400, the guide protrusion 300 guides the linear movement of the shift gear 200 along the linear movement path 400a of the guide groove 400, and thus the rim assembly 11 is linearly moved downward together with the shift gear 200 as shown in FIGS. 2 and 11.

In the present state, as the driving force of the motor continues to be applied, the rotation gear 100 continues to be rotated counterclockwise.

Accordingly, as the guide protrusion 300 is inserted into the rotating movement path 400b of the guide groove 400, the guide protrusion 300 guides the rotating movement of the shift gear 200 along the rotating movement path 400b of the guide groove 400, and thus the rim assembly 11 is rotatably moved counterclockwise by 90° together with the shift gear 200, as shown in FIGS. 3 to 12.

Accordingly, the steering wheel 10 is folded while the rim portion 12 of the steering wheel 10 enters the lower end portion of the shroud 40 at the inside space of the cockpit 50, so that an available space may be secured in the driver's seat.

Therefore, an available space is secured in the driver's seat in autonomous driving when the driver boards the vehicle or the vehicle is stopped, whereby spatial utilization and convenience in the vehicle room are improved.

Furthermore, even when the linear movement and the rotating movement of the steering wheel 10 are performed, the airbag module 30 remains a fixed state, so that the unfolding performance of the airbag of the driver's seat is maintained and the safety of a passenger in the driver's seat is secured even in a folded state of the steering wheel 10.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable steering wheel apparatus including a steering wheel configured to be rotated on a rotation shaft arranged unparallel to a steering shaft after being linear moved,
    wherein the steering wheel is configured to be linearly moved in one of radial directions of a circle centered on the steering shaft of a column, and
    wherein the steering wheel is configured to be rotated on the rotation shaft arranged orthogonal to the steering shaft.

2. The foldable steering wheel apparatus of claim 1, wherein the steering wheel is configured to be linearly moved downward, and configured so that a lower end portion of the steering wheel is rotated on the rotation shaft toward a lower portion of a cockpit.

3. The foldable steering wheel apparatus of claim 1, wherein after rotation of the steering wheel, a rim portion of the steering wheel is located parallel to a lower end portion of a shroud, so that the steering wheel is folded without interfering with the shroud.

4. A foldable steering wheel apparatus including a steering wheel configured to be rotatably moved on a rotation shaft arranged unparallel to a column after being linearly moved in a direction,
    wherein the steering wheel is configured to be linearly moved in one of radial directions of a circle centered on a steering shaft of the column, and
    wherein the steering wheel is configured to be rotated on the rotation shaft arranged orthogonal to the steering shaft.

5. The foldable steering wheel apparatus of claim 4, further including:
    an armature body fixed to the column;
    the steering wheel coupled to the armature body, configured to be linearly moved in a radial direction with respect to the steering shaft of the column, and configured to be rotatably moved on the rotation shaft which is unparallel to the steering shaft; and
    a moving device engaged to the steering wheel and configured to generate a linear movement path and a rotating movement path of the steering wheel to move the steering wheel with respect to the armature body.

6. A foldable steering wheel apparatus comprising:
    an armature body fixed to a column;
    a steering wheel coupled to the armature body, configured to be linearly moved in a radial direction with respect to a steering shaft of the column, and configured to be rotatably moved on a rotation shaft which is unparallel to the steering shaft; and a moving device engaged to the steering wheel and configured to generate a linear movement path and a rotating movement path of the steering wheel to move the steering wheel with respect to the armature body.

7. The foldable steering wheel apparatus of claim 6, wherein the rotation shaft is orthogonal at a right angle to the steering shaft.

8. The foldable steering wheel apparatus of claim 6, wherein the steering wheel is configured to be linearly moved downward, and a lower end portion of the steering wheel is rotated on the rotation shaft, which is provided in leftward and rightward directions of the armature body, toward a lower portion of a cockpit.

9. The foldable steering wheel apparatus of claim 6, wherein the steering wheel is configured to be folded by being rotated in the rotating movement path after being linearly moved in the linear movement path.

10. The foldable steering wheel apparatus of claim 6, wherein while an airbag module is fixed to the armature body to fix a location of the airbag module to the armature body, the steering wheel is movable with respect to the airbag module.

11. The foldable steering wheel apparatus of claim 6, wherein the moving device includes:
a plurality of gear members gear-engaged to each other between the armature body and the steering wheel; and
a guide device configured to guide the steering wheel to move along the linear movement path and the rotating movement path of the steering wheel.

12. The foldable steering wheel apparatus of claim 11, further including:
a driving portion configured to supply a rotary driving force to the gear members coupled to the armature body.

13. The foldable steering wheel apparatus of claim 11, wherein the plurality of gear members includes:
a rotation gear rotatably coupled to a side portion of the armature body; and
a shift gear fixed to a side portion of a rim assembly fixed in the steering wheel, and engaged with the rotation gear while being extended along a first direction in which the steering wheel is linearly moved and along a second direction bent toward one side from the first direction.

14. The foldable steering wheel apparatus of claim 13, wherein a first tooth portion is formed on a portion of a circumference of the rotation gear, and in the circumference, a rotating matching portion is formed on a portion connected to the first tooth portion; and
a second tooth portion engaged with the first tooth portion is formed, in the first direction, on a portion of an edge portion of the shift gear facing the rotation gear, and a moving matching portion having a shape corresponding to a shape of the rotating matching portion is formed on a bent portion where the second direction is bent from and is connected to the first direction.

15. The foldable steering wheel apparatus of claim 14, wherein the second tooth portion is configured to be moved along the first tooth portion and thus the steering wheel is linearly moved, and
while the rotating matching portion and the moving matching portion match with each other, the rotation gear is rotated, and thus the steering wheel is rotated on the rotation shaft of the rotation gear.

16. The foldable steering wheel apparatus of claim 13,
wherein a first tooth portion is formed along a circumference of the rotation gear, and
wherein a second tooth portion is formed along edge portion of the shift gear in the first direction and the second direction of the shift gear facing the rotation gear, and the second tooth portion is engaged with the first tooth portion.

17. The foldable steering wheel apparatus of claim 11, wherein the guide device includes:
a guide protrusion fixed on a side portion of the armature body; and
a guide groove formed in the shift gear, wherein the guide groove includes a linear guide slot and a curved guide slot formed along the linear movement path and the rotating movement path, respectively and the guide protrusion is inserted into the guide groove, so that the steering wheel is linearly moved along the linear guide slot and rotatably moved along the curved guide slot.

18. The foldable steering wheel apparatus of claim 17, wherein the linear guide slot and the curved guide slot are continuously connected to each other.

* * * * *